United States Patent

[11] 3,551,769

| [72] | Inventor | David C. Tedd<br>Cornwells Heights, Pa. |
|---|---|---|
| [21] | Appl. No. | 697,202 |
| [22] | Filed | Jan. 11, 1968 |
| [45] | Patented | Dec. 29, 1970 |
| [73] | Assignee | Eaton Yale & Towne Inc.<br>Cleveland, Ohio<br>a corporation of Ohio |

[54] ELECTRICAL CONTROL SYSTEMS FOR THE DRIVE MOTOR OF AN INDUSTRIAL TRUCK
1 Claim, 1 Drawing Fig.

[52] U.S. Cl. .................................................. 318/285,
318/373, 318/383
[51] Int. Cl. .................................................. H02p 5/06
[50] Field of Search .................................................. 318/373,
374, 383, 284, 285

[56] References Cited
UNITED STATES PATENTS

| 2,505,281 | 4/1950 | Elwood | 318/383 |
| 3,213,343 | 10/1965 | Sheheen | 318/373 |
| 3,182,243 | 5/1965 | Burr | 318/373 |
| 3,332,507 | 7/1967 | Bush | 318/383 |
| 3,335,351 | 8/1967 | Morris | 318/373 |
| 3,344,328 | 9/1967 | Morris | 318/373 |
| 3,439,247 | 4/1969 | Palmer, et al. | 318/373 |

Primary Examiner—Oris L. Rader
Assistant Examiner—K. L. Crosson
Attorney—Teagno and Toddy ABSTRACT: The drive motor of an industrial truck is operated by power pulses normally held to a constant width by the charging of a capacitor, with speed control by a pedal operated potentiometer that varies the charging of a further capacitor so as to vary the interval between power pulses. For plugging control, there is a usual power contactor interlock, and a transistor antiplugging arrangement that controls the further capacitor to reduce the interval between pulses. To prevent excessive current during the constant width pulses, there is a switch operated by release of the driver's control pedal so as to cause the first-mentioned capacitor to reduce the pulse width. If the pedal then is depressed in an attempt to plug, the plugging current will cause a diode to hold the first capacitor in pulse reducing condition. A brake operated switch will short circuit the potentiometer so that the speed control pedal need not be released when the brake is applied.

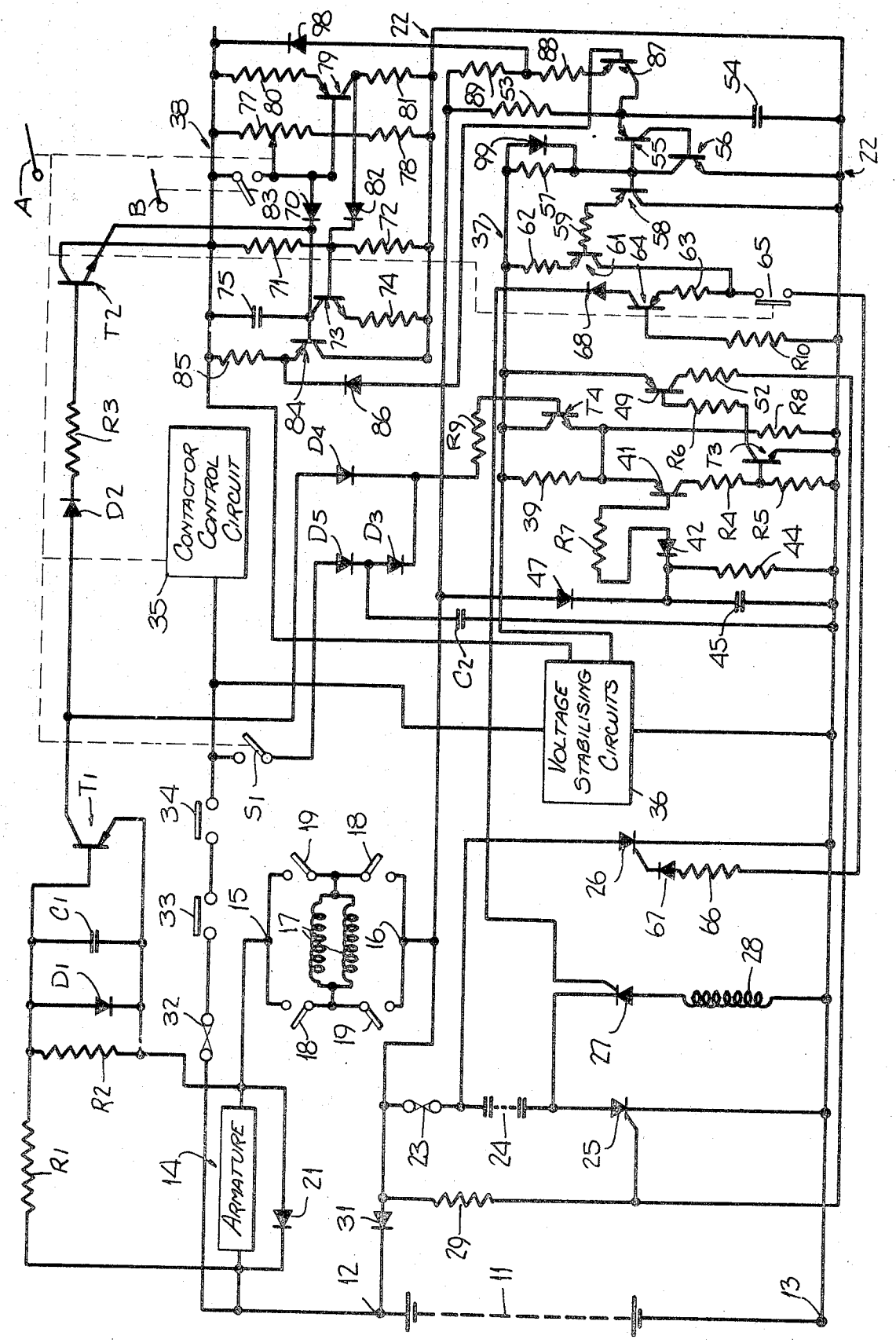

ELECTRICAL CONTROL SYSTEMS FOR THE DRIVE MOTOR OF AN INDUSTRIAL TRUCK

This invention relates to an electrical control system for the drive motor of an industrial truck, of the kind including a circuit for providing pulses of constant width to the motor, means for varying the time between said pulses to control the speed of the motor, and an antiplugging circuit for restricting the motor torque during plugging.

The term "plugging" refers to the practice of attempting to slow down a forwardly moving truck by reversing the direction of operation of the motor, so that the back e.m.f. of the motor aids the battery voltage instead of opposing it and the truck decelerates violently. The antiplugging circuit restricts the plugging current to an acceptable level when motors having an inductance above a certain level are used but when motors having a lower inductance are used excessive currents flow and the main fuses in the system blow. The invention seeks to overcome this disadvantage.

According to the invention, a system of the kind specified includes means that will reduce the width of the pulses in those instances when the antiplugging circuit does not effectively limit the plugging current.

The accompanying drawing shows a truck speed circuit utilizing the invention.

Simply for the purpose of describing my invention, I have chosen to show a truck speed circuit having details much like those described in British Patent Specifications Nos. 1,090,909 and 1,090,910, the former specification corresponding to application Ser. No. 505,279 filed Oct. 26, 1965 now Pat. No. 3,439,247. Thus, there is shown a rather usual 36 volt battery 11 having positive and negative output terminals 12,13, and forming a source of power for operating an industrial truck drive motor having an armature 14 and a field coil assembly. The field coil assembly includes first and second terminals 15,16, and first and second field coils 17 connected in parallel. The field coils have opposite ends thereof connected to the terminals 15,16 respectively through a pair of forward contactors 18 which when closed permit current to flow through the field coils from the terminals 15,16 in one direction, and in addition opposite ends of the field coils 17 are connected to the terminals 16,15 respectively through a pair of reverse contactors 19 which when closed permit current to flow through the field coils from the terminals 15, 16 in the opposite direction.

The terminal 15 is connected through the armature 14 to the terminal 12, the armature being bridged by a diode 21 having its cathode connected to the terminal 12. The terminal 16 is connected through a series circuit to a negative line 22 connected to the terminal 13, the series circuit incorporating a fuse 23, a capacitor 24 and the anode-cathode path of a controlled rectifier 25. A point intermediate the fuse 23 and capacitor 24 is connected to the anode of a controlled rectifier 26 having its cathode connected to the line 22, whilst a point intermediate the capacitor 24 and the controlled rectifier 25 is connected to the cathode of a controlled rectifier 27 having its anode connected through an inductor 28 to the line 22. The gate of the controlled rectifier 25 is connected to the terminal 16 through a resistor 29, and moreover the terminal 16 is connected through the anode and cathode of a diode 31 to the terminal 12.

The terminal 12 is connected through a fuse 32 and switches 33,34 in series to a contactor control circuit 35 whereby the driver of the truck can close either the forward or reverse contactor. The details of the circuit 35 are not important to an understanding of the present invention, but may be like those described in British Patent Specification No. 1,090,907, corresponding to Application Serial No. 505,205, filed Oct. 26, 1965. The switch 34 is key-operable, and the switch 33 closes when the driver is seated on the truck. Connected across the battery in series with the fuse 32 and switches 33,34 are voltage stabilizing circuits 36 which supply 18 volts to a positive line 37, and 27 volts to a positive line 38. Connected to the positive line 37 through a resistor 39 is the emitter of a p-n-p transistor 41 the collector of which is connected to the line 22 through resistors R4,R5 in series, and the base of which is connected through a resistor R7 to the anode of a diode 42. The cathode of the diode 42 is connected to the line 22 through a resistor 44 and a capacitor 45 in parallel, and is connected to the terminal 16 through the cathode-anode path of a diode 47. The emitter of the transistor 41 is further connected to the emitter of a transistor T4, the collector of which is connected to the line 37 and the emitter of which is further connected through a resistor R8 to the line 22.

The junction of resistors R4,R5 is connected to the base of an n-p-n transistor T3, the emitter of which is connected to the line 22, and the collector of which is connected through a resistor R6 to the base of a p-n-p transistor 49 having its emitter connected to the line 37 and its collector connected to the gate of the controlled rectifier 25 through a resistor 52. The base connections of the transistor T4 will be referred to later in the specification.

Connected in series between the terminal 16 and the line 22 are a resistor 53 and a capacitor 54, a point intermediate which is connected to the emitter of a p-n-p transistor 55 having its collector and base connected respectively to the base and collector of an n-p-n transistor 56 the emitter of which is connected to the line 22. The base of the transistor 55 is connected through a resistor 57 in parallel with the anode-cathode path of a diode 99 to the line 37 and is also connected to the base of a transistor 58 the collector of which is connected to the line 22 and the emitter of which is connected through a resistor 59 to the base of a p-n-p transistor 61. The transistor 61 has its emitter connected through a resistor 62 to the line 37 and its collector connected through a resistor 63 to the emitter of a p-n-p transistor 64, and also through a switch 65 resistor 66, which is connected through the anode-cathode path of a diode 67 to the gate of the controlled rectifier 26. The transistor 64 has its base connected to the line 22, via a resistor R10 and its collector connected through the anode-cathode path of a diode 68 to the gate of the controlled rectifier 27.

The operation of this part of the truck speed circuit is as follows:

Before the driver closes one pair of contactors, the switches 33,34 are closed and power is supplied from the battery to the voltage stabilizing circuits 36. At this stage, the terminal 16 is at zero volts, and consequently, there will be no charge across the capacitor 45. The transistor 41 receives base current by way of resistor 44 and conducts, so permitting conduction of the transistor T3, which in turn permits conduction of the transistor 49. The transistor 49 supplies gate current to the rectifier 25, which does not at this stage conduct as its anode-cathode voltage is zero.

As soon as the contactors close, the potential at the terminal 16 rises to the positive battery potential, and current flows through the armature 14 and coils 17 to charge the capacitor 24 positively. This current is insufficient to move the truck. At this point the capacitor 45 is charged, so switching off the transistor 41, T3, 49. However, the controlled rectifier 25 is maintained conductive by current flow to its gate through the resistor 29.

When the contactors close, the capacitor 54 also commences to charge through the resistor 53, and when its voltage exceeds 18 volts the transistor 55 conducts. The transistors 55,56 are interconnected in a known manner so that they act in effect as a controlled rectifier and switch on very rapidly. Consequently, the base voltage of the transistor 58 falls rapidly and the transistors 58,61 conduct. The switch 65 closes when the throttle pedal A is depressed beyond a set amount, and provided the switch 65 is closed current flows from the transistor 61 to the gate of the controlled rectifier 26 to switch it on. At the same time, current from the transistor 61 flows through the transistor 64, the gate and cathode of the controlled rectifier 27, and through the controlled rectifier 25 to switch on the controlled rectifier 27. It will be noted that no current flows in the transistor 64 except when the transistor 61 conducts.

As soon as the controlled rectifier 26 conducts, the voltage at the terminal 16 falls close to zero and the capacitor 54 discharges, so that the transistor 61 ceases to conduct, and no further gate current flows to the controlled rectifiers 26,27. Before these gate currents cease, however, current from the battery flows through the controlled rectifier 27 from the motor, this current rising in a manner controlled by the inductive nature of the motor. The motor now drives the truck. At the same time, the capacitor 24 discharges inductively by way of the controlled rectifier 26, the inductor 28 and the controlled rectifier 27. When the gate currents cease, current still flows from the motor through the controlled rectifier 26, and the capacitor 24 continues to transfer its charge until the current flowing through the controlled rectifier 27 is insufficient to maintain it on. Thus, the capacitor 24 is left with a negative charge.

When the controlled rectifier 26 conducts and the voltage at the terminal 16 falls close to zero, the capacitor 45 discharges through the resistor 44, and after a predetermined fixed time the transistor 41 conducts again and a pulse is applied to the gate of the controlled rectifier 25 as before, so allowing the capacitor 24 to discharge and reverse bias the controlled rectifier 26, so switching it off. The capacitor 24 then recharges through the controlled rectifier 25 and the cycle continues as before. When the current from the battery to the motor is cut off, the diodes 21,31 conduct back e.m.f.

The speed of the motor is varied by varying the time taken for the capacitor 54 to charge sufficiently to switch the transistor 55 on, and the way in which this is accomplished will now be described.

Connected between the lines 38,22 in series are a pair of resistors 71,72, a point intermediate these resistors being connected to the base of an n-p-n transistor 73 having its emitter connected to the line 22 through a resistor 74 and its collector connected to the line 38 through a capacitor 75.

The collector of the transistor 73 is connected to the cathode of a diode 70 having its anode connected to the slider of a potentiometer 77. The slider is controlled by the throttle pedal A of the truck, and moves over the potentiometer resistor 77 connected in series with a resistor 78 across the lines 38,22.

The slider of potentiometer 77 is further connected to the base of a p-n-p transistor 79 having its emitter and collector connected to the lines 38,22 through resistors 80,81 respectively, and its collector connected through the anode-cathode path of a diode 82 to the base of the transistor 73. Moreover, the slider of potentiometer 77 is connected to the line 38 through a normally open switch 83.

There is further provided a p-n-p transistor 84 having its base connected to the collector of the transistor 73, its collector connected to the line 22 and its emitter connector to the line 38 through a resistor 85. The emitter is further connected through the cathode-anode path of a diode 86 to the base of a p-n-p transistor 87 having its collector connected to the junction of resistor 53 and capacitor 54 and its emitter through resistors 88,89 in series to the terminal 16. A point intermediate the resistors 88,89 is connected via the anode-cathode path of a diode 98 to the line 38.

The transistor 73 is biased to conduction and so its collector-emitter current is limited only by the resistor 74. When the throttle pedal is not depressed, the slider is at the end of the potentiometer 77 nearer the line 38 and so the collector voltage is at a maximum value. Under these conditions, the transistors 84,87 are both off and the charging current for the capacitor 54 is limited by the resistor 53. The motor power is now at a minimum value which in practice will be insufficient to move the truck. As the throttle pedal A is depressed, the slider moves across the potentiometer 77, so that the collector voltage of the transistor 73 falls, so causing the transistors 84,87 to conduct. Current flowing through the transistor 87 now charges the capacitor 54 in addition to the current through resistor 53 and the more the pedal A is depressed, the more transistor 87 conducts, the faster capacitor 54 charges and the faster the speed of the motor.

The capacitor 75 acts as an acceleration control, because when the throttle pedal A is depressed the fall of the collector voltage is limited by the charging rate of the capacitor 75.

The acceleration will be limited by the capacitor 75 while speeds are increased to an intermediate valve, and the components 78, 80, 81, 82 are incorporated to permit more rapid acceleration to top speed. Since the base of the transistor 79 is connected directly to the slider of potentiometer 77, the current flowing through the transistor 79 depends on the position of the throttle pedal A. Except when the throttle pedal A is nearly fully depressed, the voltage drop across the resistor 72 exceeds the voltage drop across the resistor 81, and so the diode 82 cannot conduct. However, when the throttle pedal A is fully depressed the voltage drop across the resistor 81 exceeds that across the resistor 72, so that the diode 82 conducts and increased base current flows in the transistor 73, so decreasing the time taken for the capacitor 75 to charge and permitting the truck to accelerate more rapidly.

When the driver of the truck is negotiating a corner, he will normally have to apply the brakes of the truck, and so would have to ease the throttle pedal A. In order to remove the necessity of easing the throttle pedal, the switch 83 is included, and is closed when the brake pedal B is depressed, so that the slider of potentiometer 77 is connected to the line 38 and the speed of the motor is reduced to a minimum irrespective of the position of the throttle pedal. When the corner has been negotiated, the brakes are released and the switch 83 opens. The truck then accelerates to the speed indicated by the throttle pedal A at a rate governed by the capacitor 75. It will be noted that the reduction of speed is achieved without opening the contactors. The circuit only allows a very small current in the motor when the brakes are applied, and so minimizes overheating of the motor if the controls of the truck are abused by the operator.

The switch 83 may be operated hydraulically when the brakes are applied. However, where it is required that other switches, for example lighting switches, are operated when the brakes are applied, a relay having the required number of contacts may be included and arranged to be energized on application of the brakes. Alternatively, hydraulically operated switches may be connected in parallel with the master brake cylinder of the truck.

The contactor control circuit 35 includes a usual interlocking arrangement which is intended to prevent plugging of the truck drive motor. Thus, supposing that the truck is travelling at full speed in the forward direction, then the circuit 35 by its design will prevent reversal of the contactors to reverse the direction of operation of the motor until the throttle pedal A is first released. however, it generally is possible for a driver to release the throttle pedal A, then to reverse the contactors so that the motor is capable of being driven in the reverse direction, and then to press the throttle pedal again. while the truck is travelling in the forward direction, and the forward contactors are closed, the back e.m.f. of the motor will be opposing the battery voltage and a stable state will be reached. However, if the motor is driven in the reverse direction in the manner explained above whilst the truck is travelling in the forward direction, the back e.m.f. of the motor will assist the battery voltage, so that the truck is decelerated extremely violently. The violence of the deceleration is controlled to some extent by the diode 21, but this diode is not in itself sufficient for this purpose, and so the speed control system is equipped with an antiplugging circuit.

The antiplugging circuit includes resistors R1,R2 connected in series between the terminals 12,15 so that they are in effect connected directly across the armature 14. The resistor R2 is bridged by a diode D1 and a capacitor C1 in parallel, and connected across the capacitor C1 is the base-emitter circuit of a p-n-p transistor T1, the collector of which is connected through the anode-cathode path of the diode D1 and a resistor R3 in series to the base of the transistor T2, the emitter of which is connected to the cathode of a diode 70, and the collector of which is connected to the line 38, so that the collector-emitter path of the transistor T2 is connected directly across the capacitor 75. During normal operation of the truck, the transistor T1 has its base-emitter circuit reverse biased by the diode D1. However, when the truck is plugged, the diode D1 will be reverse-biased, and the base of the transistor T1 will be driven negative with respect to its emitter, so that it will conduct. Current will now flow into the base-emitter circuit of transistor T2, which will conduct and in effect short circuit the capacitor 75. The collector voltage of the transistor 73 in will now be held at the voltage of the line 38 until the truck stops, and since, as previously explained, the transistor 73 in effect controls the speed of the truck, the arrangement is such that the circuit can only operate at its lowest power output until the truck stops. The deceleration of the truck will, in these circumstances, be determined by the value of the resistor 53.

While the antiplugging circuit has very desirable features and in many cases offers effective plugging control, it has been found that the control actually is not complete and there may yet be trouble due to plugging. That is particularly true where the truck drive motor has low inductance. Then, even though the periods between pulses are adjusted to keep the motor speed at a predetermined low value, the current during the constant width pulses can rise to a value at which the fuses will blow.

Through the novel concept of the present invention, it is possible to restrict the current more effectively. As will be seen in the drawing, there is utilized a transistor T4, the base of which is connected through a resistor R9 to the cathodes of a pair of diodes D3,D4 The anode of the diode D3 is connected through a capacitor C2 to the line 22, and is further connected through the cathode-anode path of the diode D5 and a switch S1 in series to the junction of the switch 34 and the circuit 35. The switch S1 is closed when the throttle pedal A is not depressed, and for this purpose the switch S1 may be one of the switches already present in the circuit 35. The anode of the diode D4 is connected to the collector of the transistor T1.

If an attempt is made to plug the truck, the contactor control circuit 35 requires that the driver must first release the throttle pedal A, and the release of the throttle pedal closes the switch S1. Current now flows through the diodes D5,D3 and the resistor R9 to turn on the transistor T4 which short circuits the resistor 39. The pulse width is governed by the time taken for the capacitor 45 to discharge sufficiently to turn the transistor 41 on, and the conduction of the transistor T4 effectively raises the emitter voltage of the transistor 41, so that the capacitor 45 does not have to discharge so much before the transistor 41 switches on. The effect of this is that the pulse width is reduced, and in one example the component values are so chosen that the pulse width is halved.

I claim:

1. An electrical control system for the drive motor of an industrial truck, comprising circuit means for providing power pulses of constant width to the motor, means for varying the time period between said constant width pulses to control the speed of motor, means for plugging the motor, an antiplugging circuit operating in response to plugging of the motor for restricting the motor torque during plugging, means coacting with said pulse providing means for reducing the width of said pulses during the operation of said antiplugging circuit, said means for reducing the pulse width is responsive to the operation of the antiplugging circuit, including means reducing the pulse width to a predetermined value on commencement of plugging and gradually increasing the pulse width as the current flowing through the motor decreases, a transistor which when it conducts terminates each pulse applied to the motor, the transistor being nonconductive at the commencement of a pulse with its emitter potential set by a resistor, a capacitor determining the base potential of the transistor and commencing to discharge at the commencement of a pulse so as to vary the base potential and to turn on the transistor after a predetermined period of time determined by the resistor, said means for reducing the pulse width during plugging comprising a second transistor having its collector-emitter connected across the resistor, the second transistor being rendered conductive during plugging so as to change the emitter potential of the first-mentioned transistor and to reduce the amount by which the capacitor must discharge before the first transistor turns on, so as to reduce the pulse width, the base current of the second transistor being dependent on the current flowing through the motor so that the pulse width gradually increases until it reaches its normal constant value with the second transistor off.